(No Model.) 2 Sheets—Sheet 2.
M. BUTLER.
CAR BRAKE.
No. 495,165. Patented Apr. 11, 1893.
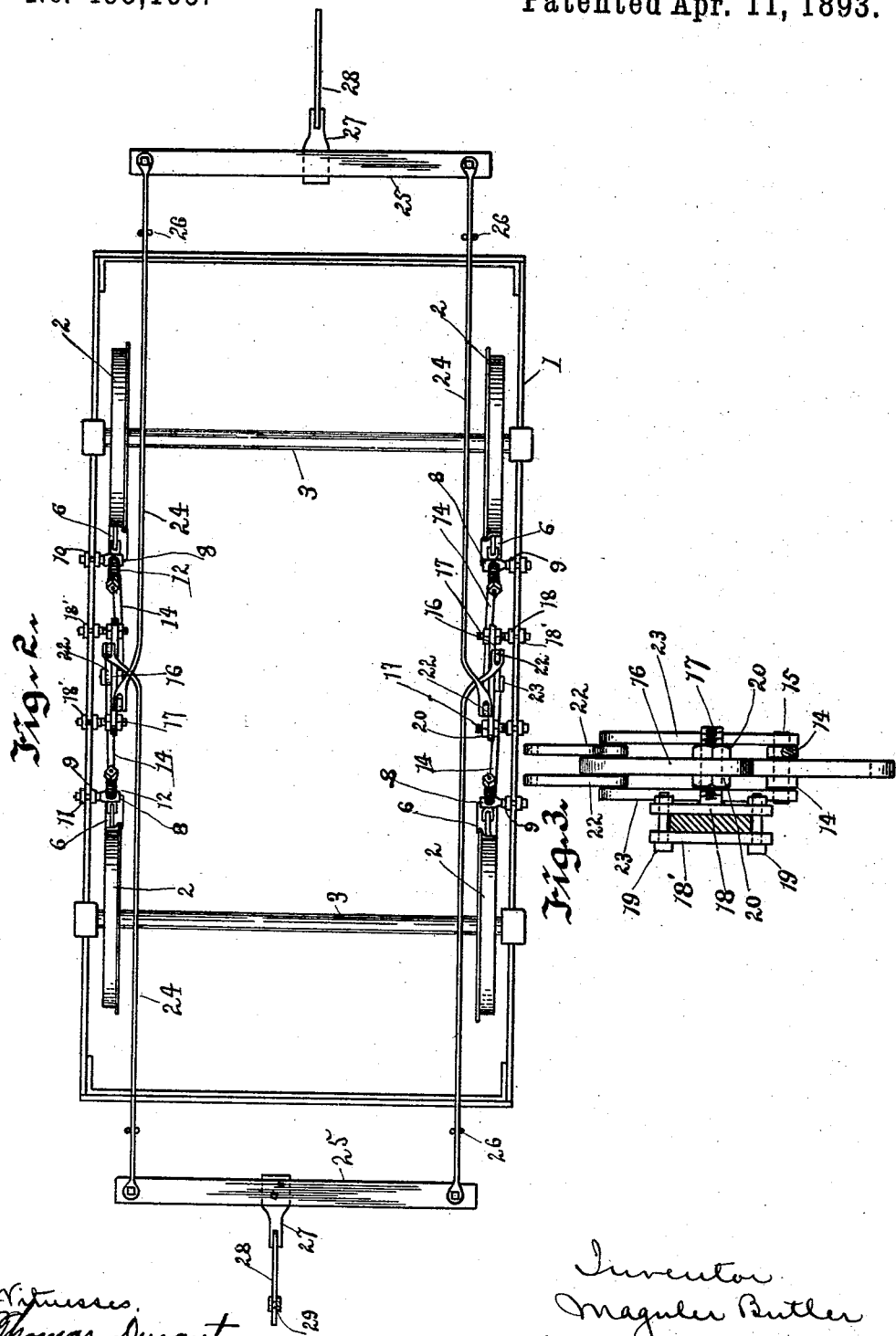

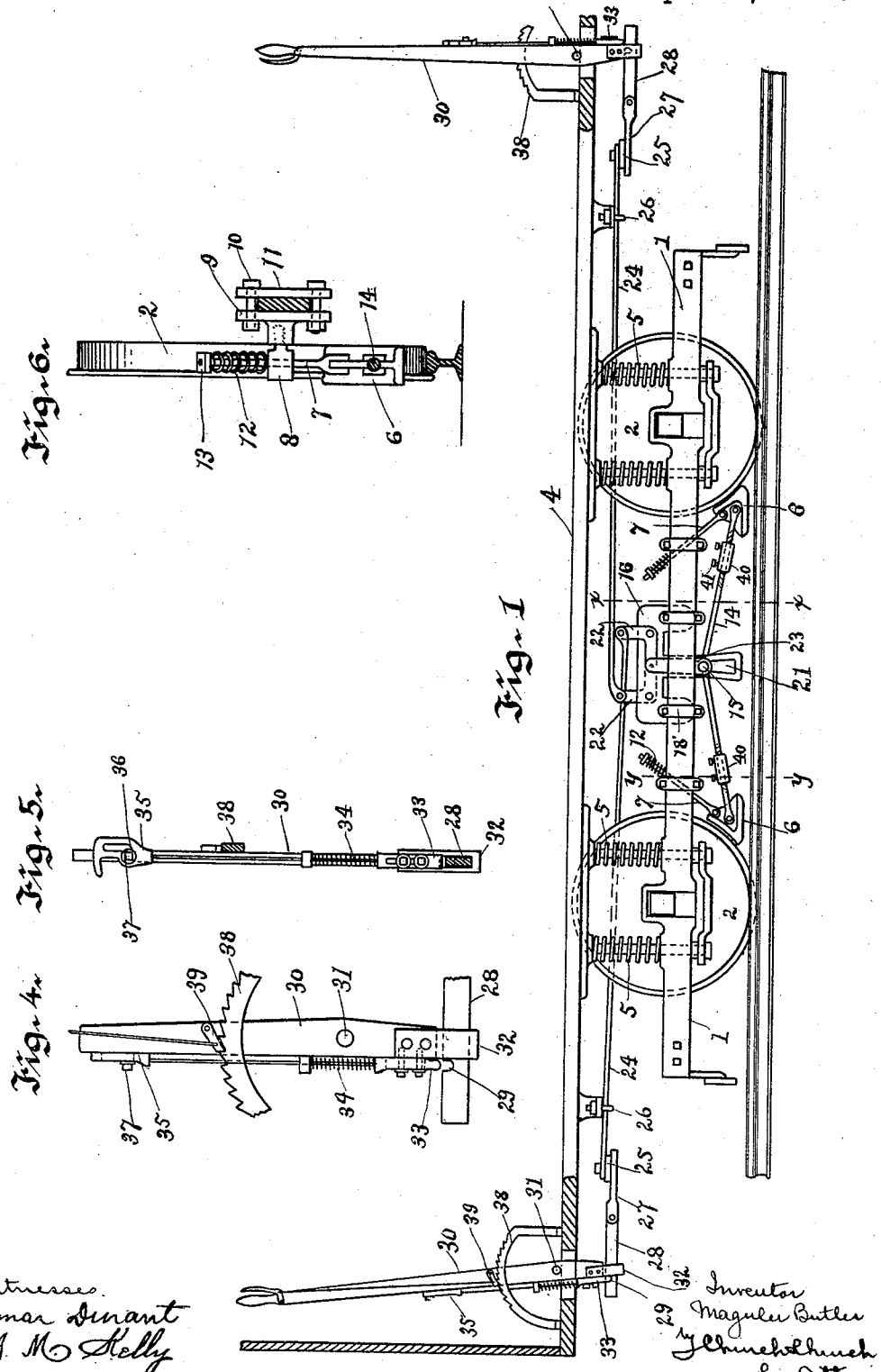

UNITED STATES PATENT OFFICE.

MAGULER BUTLER, OF ROCHESTER, NEW YORK, ASSIGNOR TO CHARLES J. WICHMANN AND LEWIS W. HORN, OF SAME PLACE.

CAR-BRAKE.

SPECIFICATION forming part of Letters Patent No. 495,165, dated April 11, 1893.

Application filed January 25, 1893. Serial No. 459,692. (No model.)

*To all whom it may concern:*

Be it known that I, MAGULER BUTLER, of Rochester, in the county of Monroe and State of New York, have invented certain new and useful Improvements in Car-Brakes; and I do hereby declare the following to be a full, clear, and exact description of the same, reference being had to the accompanying drawings, forming a part of this specification, and to the reference numerals marked thereon.

My present invention has for its object to provide an improved brake particularly adapted to be applied to the wheels of street-cars and to the tracks, as well, and especially adapted for the use of cars propelled by electric or other motors arranged beneath the body of the car where the ordinary brakes cannot be readily employed owing to the lack of space, some of the parts being, as well, adapted to other forms of cars or vehicles, and to these and other ends it consists in certain improvements in construction and combinations of parts, all as will be hereinafter fully described and the novel features pointed out in the claims at the end of this specification.

In the drawings: Figure 1 is a side elevation of the lower portion of a street-car partly in section showing the application of my improved brake thereto. Fig. 2 is a plan view of the truck showing the arrangement of parts; Fig. 3, a section view on the line $x$—$x$ of Fig. 1; Fig. 4, a side view of the operating handle or lever and the means of connection with the brake; Fig. 5, a front view of the same; Fig. 6, a sectional view on the line $y$—$y$ of Fig. 1.

Similar reference numerals in the several figures indicate similar parts.

The present embodiment of my invention is shown as particularly adapted to a style of electric street-car-truck now in extensive use, and though I prefer this arrangement of parts, it is obvious that it could be adapted with slight modifications to other varieties of cars.

1 indicates the truck in which are located suitable bearings for the wheels 2 on axles 3 to which latter the motors are preferably connected, and 4 the floor of the car body supported on suitable springs 5 resting on the truck, as usual. The brake-shoes 6, which are preferably wedge-shaped and are adapted to engage the wheels and the track as well when the brake is applied, are pivoted to links or rods 7 passing through swivel bolts 8 screwing loosely in plates 9 provided with suitable threaded apertures therefor; which plates are secured to the side bars or beams of the truck by means of bolts 10 and retaining plates or clips 11, as shown in Fig. 6. Suitable springs 12 encircling the links 7 are arranged between adjustable nuts 13 on the end thereof and the swivel bolts 8; said links and springs being so arranged relatively to the wheels that the shoes will be drawn upward from the tracks, while their movement away from the wheel treads will be caused by thrust rods 14 pivoted upon pins 15 and to the brake shoes; two shoes on each side being thereby connected to form toggles, which when straigtened by the downward movement of the pin 15 will press the shoes in contact with the wheels and tracks against the tension of the springs 12 and when the toggles are flexed again, said springs will withdraw the shoes, as will be understood.

16 indicate plates or supports secured upon threaded extensions 17 of plates 18 clamped upon the side beams of the truck by plates 18' and bolts 19, as in Fig. 3, the lateral position of said plates being adjustable by means of nuts 20 arranged on the bolts 17 and engaging opposite sides of said plates. These plates are provided with downward extensions slotted at 21 through which pass the pivotal bolts 15 connecting the arms of the toggle and pivoted upon opposite sides of said plates are bell crank levers 22 connected by links 23 with the pins 15, the upper ends of said levers being connected by draft rods 24 with cross beams 25 arranged at the ends of the car. The draft rods arranged on the same side of the car cross each other, as shown, to allow for their movements in opposite directions and are supported near the ends of the car by hooks or staples 26, and the cross bars 25 connecting those at the same ends of the car are adapted to be operated by the driver or motor-man, in the present instance, toward the end of the car, to set the brakes, the operation being to draw upon the rods, turning the bell cranks on their pivots, pressing the pivots of the toggles downward and forcing the brake-shoes between the wheel and track, as will be readily understood. As the bars 25 move in opposite directions loose connections must be provided between them and the operating handle or brake-lever in order that the brake may be operated from either end of the car. Chains winding upon the usual manually operated shaft could be employed for this purpose, if desired, but I prefer to use detachable levers, as shown in Figs. 1, 4 and 5 herein.

In this construction I provide the cross bars or beams 25 at the ends of the cars with brackets 27 to each of which is pivoted a link or bar 28 provided with the notch 29 in its upper side, as shown in Figs. 1 and 4. The operating lever or handle 30 pivoted at 31 is provided on its lower end with a loop 32 through which the link 28 passes, and arranged on the front side of the lever is a dog or bolt 33 moved downward by a spring 34 inserted between it and a lug on the lever, and connected to the upper end of this bolt is a catch piece 35 having a longitudinal and a transverse slot 36, which latter is adapted to co-operate with a pin 37, so that when desired to disconnect the lever and link 28, it is only necessary to raise the catch piece and move it laterally, with the pin in the transverse slot, as shown in Fig. 5. The brake lever is provided with an ordinary ratchet segment 38 and a pawl 39 for engaging it, and holding it in any position to which it may be adjusted, an ordinary pawl-releasing handle being employed as shown. In Fig. 1 the lever to the left is shown engaged with the brake mechanism by the bolt 33 as it would be if the car were moving in that direction and the operator can therefore apply the brake in the well understood manner from this end of the car, while at the other end the lever is disconnected, as shown in Fig. 5, the link moving through the loop on the end of the lever loosely and without moving the latter.

The parts are so constructed that they can be readily adjusted and applied to cars now in use and the wear on the brake-shoes can be compensated for by the adjustment of the thrust bars 14, which are preferably composed of two parts connected by a nut 40 provided with right and left threads and secured in position by set screws 41. This arrangement of parts, it will be noticed, does not occupy any of the space devoted to the motor and can readily be substituted for any of the brakes now in use with good effect, and inasmuch as it grips both the wheels and rail will serve to arrest the car more readily than by means of the brake-shoes applied only to the wheels.

While in the present arrangement I have shown and prefer to employ independent brake-shoes on opposite sides of the car connected only by the beams at the ends, it is obvious that they could be connected at the center of the car if desired, but such construction would not be as well adapted to electric street-cars in which the motor is located in the trucks, as shown.

It will be understood that it is not essential to my invention that the brake shoes be applied to the track as well as to the wheel, and in the claims where brake shoes are mentioned, it is intended that shoes operating to arrest the car be understood whether they operate on the wheels alone or on the track and wheels unless specific mention is made of wheel and track shoes.

The springs 12 are not of themselves strong enough to release the brake-shoes, but simply assist in the operation, the positive reverse movement of the lever at the end of the car being required for this purpose because if they were strong enough, the power required to overcome their force and apply the brake would, in the present arrangement, be too great and this is one reason for employing brake-levers having a positive connection with the cross beams.

It is obvious that other forms of braking mechanism could be employed in connection with the operating levers at the ends of the cars and detachably connected with said mechanism, and I do not therefore desire to be limited in respect to this detachable connection to its use in connection with the particular arrangement of track and wheel brake-shoes shown herein.

I claim as my invention—

1. The combination with the wheel and track brake-shoes, the supporting links pivoted thereto, the swiveling guides for the links and the retracting springs, of the toggle arms pivoted to the brake-shoes, and means for straightening the toggles and applying the brake, substantially as described.

2. The combination with the wheel and track brake-shoes and guides therefor, of the toggle arms connected to the brake-shoes, the two bell crank levers connected to the pivot of the toggle, and means for operating said levers from opposite ends of the car, substantially as described.

3. The combination with the wheel and track brake-shoes and guides therefor, of the toggle arms connected to the brake-shoes, the links connected to the pivot of the toggle, the bell crank levers pivoted at one end to the links, and draft rods connected to the other ends of said levers and movable in opposite directions when the brakes are applied, substantially as described.

4. The combination with the wheel and track brake-shoes and guides therefor, of the toggle arms connected to the brake-shoes, the bell crank levers connected to the pivot of the toggle, the draft rods connected to the other ends of said levers, and brake-levers arranged at opposite ends of the car detachably connected to said rods, substantially as described.

5. The combination with the two pairs of wheel and track brake-shoes and guides therefor, of the two pairs of toggle arms connected to the shoes, the two pairs of crank levers, one pair connected to the pivot of each toggle, connections between one of the levers of each pair, and operating levers arranged at each end of the car connected detachably with each connected pair of bell crank levers, substantially as described.

6. The combination with the side bar of the truck, the plate secured thereto having the slot and the bell crank levers pivoted thereon, of the brake-shoes, the supporting links, the toggle arms connected to said shoes having the pivot pin in the slot, and the links connecting the pivot of the toggle with the levers, substantially as described.

7. The combination with the side bar of the truck, the brackets secured thereto having the threaded extensions, the plate adjustably secured on said extensions and the bell-crank levers pivoted on the plate, of the toggle arms, the brake-shoes thereon, and the links connecting the bell crank levers with the pivot of the toggle, substantially as described.

8. In a car-brake, the combination with suitable brake-shoes, the beams connected with the shoes and operated positively in opposite directions at each application of the brake, of the actuating levers and detachable connections between them and the beams, whereby the brake may be applied by either lever independently of the other, substantially as described.

9. In a car-brake, the combination with the brake-shoes and a movable bar or beam for actuating them, of an operating lever for operating on said bar, and a detachable connection between said lever and bar, substantially as described.

10. In a car-brake, the combination with the brake-shoes and a movable bar connected therewith having the recess, of an operating lever having a movable bolt thereon arranged to be moved to engage said recess and connect the parts, substantially as described.

11. In a car-brake, the combination with the brake-shoes and a movable bar connected therewith having a recess, of an operating lever having a spring-pressed bolt thereon, arranged to automatically engage said recess and connect the parts, and a catch for holding it out of engagement, substantially as described.

12. In a car-brake, the combination with the brake-shoes and two bars connected therewith and movable in opposite directions when the brake is applied, each bar having a recess therein, of the two operating levers, each having a spring-pressed bolt for engaging the recesses, and catches for retaining said bolts out of engagement, substantially as described.

13. The combination with the movable bar having the recess therein and connected to a brake mechanism, of the pivoted operating lever having the loop encircling the bar, the spring operated bolt, and the catch for retaining said bolt against the pressure of the spring, when desired, substantially as described.

14. The combination with the brake shoes, the pivoted links supporting them, of the toggle arms pivoted to the brake shoes, the two bell-crank levers connected to the pivot of the toggle, and means for operating said levers from opposite ends of the car, substantially as described.

15. The combination with the brake shoes and supports therefor, of the toggle arms pivoted to the brake shoes, the links connected to the pivot of the toggle, the bell-crank levers pivoted at one end to the links, and draft rods connected to the other ends of said levers and movable in opposite directions when the brakes are applied, substantially as described.

MAGULER BUTLER.

Witnesses:
LEWIS W. HORN,
FRED F. CHURCH.